Patented Feb. 9, 1954

2,668,790

UNITED STATES PATENT OFFICE 2,668,790

ISOMERIZATION OF PARAFFIN WAX

George M. Good, Amsterdam, Netherlands, and John W. Gibson and Bernard S. Greensfelder, Oakland, Calif., assignors to Shell Development Company, Emeryville, Calif., a corporation of Delaware No Drawing. Application January 12, 1953, Serial No. 330,894

4 Claims. (Cl. 196—50)

This invention relates to a new and useful process for the isomerization of paraffin wax. The invention also relates to a process for the production of lubricating oil and isoparaffin wax from paraffin wax. The invention also relates to novel lubricants.

This application is a continuation-in-part of our copending application, Serial Number 241,898, filed August 14, 1951.

Paraffin wax is a normally solid wax-like substance composed of high molecular weight hydrocarbons. It is called paraffin wax to distinguish it from the vegetable and animal waxes which are composed largely of oxygenated compounds. It is usually obtained from the heavier fractions of petroleum such as are used for the production of lubricating oils as well as certain burning oils. In nearly every case, it is an undesired constituent in such oils and is removed by known so-called dewaxing methods during refining. While paraffin wax is useful for many purposes such as sealing containers, production of waxed paper, production of water-proofed cartons and the like, and finds a large and wide use, there is still a considerable amount of paraffin wax for which there is no ready market.

Various processes have been proposed for the treatment or conversion of paraffin wax. Those processes resulting in a hydrocarbon product generally involve a refining operation which produces a normally solid wax of impproved characteristics, or a more drastic conversion treatment which results in the production of a liquid product. The former usually comprises such steps as solvent extraction, fractional crystallization, clay treatment and the like, in which the structure of the hydrocarbons is unaltered. The latter involves a step in which the hydrocarbons are decomposed or split to give a wide range of products comprising normally gaseous and normally liquid products, most of which are of relatively low value. It would be most advantageous to have a practical process whereby paraffin wax could be converted into more valuable hydrocarbon products. One possibility lies in isomerization.

By isomerization of paraffin wax is meant the treatment of the wax under conditions to isomerize the hydrocarbon constituents into isomers having the same molecular weight but a more branched structure. Some isomerization may take place in other drastic conversions of the wax but the term "isomerization process" is considered to designate only a process in which such isomerization to a more branched structure takes place to a substantial extent.

It is known that the melting points of the wax hydrocarbons are lowered upon isomerization to isomers having a more branched structure. Merely by way of example, normal hexacosane, a typical wax constituent, is a waxy solid having a melting point of 56° C. whereas, its isomer 6,6 dipentyl hexadecane is a normally liquid compound having a melting point of —40° C. Thus, by suitable isomerization a substantial conversion of even high molecular weight paraffin wax to a normally liquid product may be obtained. This liquid product is an oil having particularly desirable properties. The isomerization can be accomplished and has been accomplished as described in U. S. Patent No. 2,475,358.

The main difficulty encountered in attempts to isomerize paraffin wax is in preventing excessive degradation (cracking) to lower molecular weight products of little value. It is well known and generally recognized that the tendency for hydrocarbons to crack increases rapidly with increasing molecular weight. This holds both for thermal cracking as well as cracking induced by a cracking catalyst. Thus, whereas normal butane may be converted to isobutane quite selectively, the selective isomerization of paraffins of higher molecular weight becomes increasingly difficult as the molecular weight is increased. In the method described in U. S. Patent No. 2,475,358, a fairly selective isomerization of paraffin wax is obtained by the use of Friedel Crafts-type catalyst which has been modified to decrease its cracking tendency and by simultaneous use of a large amount of a cracking-suppressor (decahydronaphthalene). While this method affords a moderate yield of lubricating oil of high viscosity index, and also diesel fuel of good cetane number, the recovery of the product requires special steps, and some catalyst is lost in each cycle. The process also involves the handling of corrosive liquids, and the isomerization reaction is intrinsically slow so that large reactors are required.

Our above mentioned copending application describes a new process whereby paraffin wax may be isomerized quite selectively and at a much faster rate with the production of good yields of excellent oil and isoparaffin wax; the process is quite simple and no corrosive reagents are involved. In this process the paraffin wax is isomerized by treatment with a platinum-containing catalyst.

The process is applicable for the isomerization of any normally solid hydrocarbon wax. The wax will usually be derived from natural mineral sources such as petroleum, oil shale, oil from tar sands, gilsonite, ozokerite, or the like, but synthetic wax produced by the Fischer-Tropsch synthesis or as a by-product of other processes may also be isomerized. The process may be applied for the isomerization of crude so-called slack wax, or to refined waxes of various melting points or to so-called residue wax. While the various waxes differ somewhat in properties, e. g., melting point and hardness, they are all composed of hydrocarbons containing long paraffinic chains. In some paraffin waxes the chains may be slightly branched and in some the chains may be attached to naphthenic or aromatic groups. Olefinic groups are rarely present; when present they do not affect the operation of the process. In any case, the paraffin chain of the wax molecules can be isomerized to give a product having a more highly branched structure.

The paraffin wax is isomerized through the aid of a supported platinum catalyst. Palladium or nickel may be substituted for platinum if desired. The platinum may be applied on a number of conventional carrier materials hitherto employed as a support for platinum catalyst. Suitable supports are described in U. S. Patents Numbers 2,478,916 and 2,550,531. Alumina is a preferred support material. So-called activated alumina (gamma alumina) and activated bauxite are quite suitable. The alumina should be substantially free of alkaline materials such in particular as the alkali and alkaline earth metals. In order to insure the absence of any appreciable amounts of such alkaline materials in the catalyst and to promote the catalyst, it may be desirable to treat the carrier material with a halogen compound, e. g., HCl, or HF, prior to incorporating the platinum. The amount of platinum in the catalyst may vary from a few hundredths of a per cent, e. g., 0.05% to about 1%. The preferred concentration of platinum is between about 0.1% and about 0.6%.

The platinum may be applied to the support in any one of several known ways. One suitable method is to impregnate the support material with a solution of a platinum salt, followed by drying and reducing in the conventional manner. Thus, for example, pellets of activated alumina may be treated with HF and then soaked in a solution of chloroplatinic acid, dried, and reduced in hydrogen at 475° C. Commercial "0.5% platinum on alumina pellets" made by Baker and Company, Inc., Newark, New Jersey, can be used.

An essential feature of the process described in the copending application is that the isomerization is carried out in the presence of a large amount of hydrogen. The mole ratio of hydrogen to hydrocarbon should be at least 1 and preferably above 5 and may be much higher. In practical operation ratios above 300 are sometimes required.

In carrying out the process the wax is vaporized in a suitable vaporizer, mixed with the hydrogen, and the mixture is passed into contact with the catalyst. The contact is most conveniently effected by supporting a bed of the catalyst in a reaction tube and passing the vapor mixture through the bed. The vapors issuing from the reaction tube are cooled to condense the product and the gas is then separated from the condensate. This gas is recycled. During repeated recycling of the gas the hydrogen gradually becomes diluted with inert gases produced by the minor amount of side reactions in the process. This is not particularly harmful as long as the specified minimum amount of hydrogen is applied. In order to prevent the dilution from becoming excessive, a small amount of the gas may be continuously withdrawn and replaced with fresh hydrogen. The temperature in the bed is between 300° C. and 550° C. and is preferably between about 375° C. and about 490° C. The operation may be carried out under reduced pressure, at atmospheric pressure, or at considerably elevated pressures. Pressures between about 50 and 3000 p. s. i. g. are suitable, pressures of the order of 300–1,000 p. s. i. g. being generally preferred. Under the conditions of temperature and pressure employed and in the presence of the large amount of hydrogen, the wax is retained in the vapor phase.

Under the described conditions, the isomerization takes place at a rapid rate. Thus a contact time of the vapor mixture with the catalyst of only a tenth of a second is sufficient in many cases to afford a practical conversion. It is evident that with such rates a small reactor is capable of handling a large throughput. Longer contact times may, however, be used, particularly when operating at the lower temperatures. However, the contact time should not be so long at any given temperature to cause excessive cracking. The contact time may usually be adjusted between 0.5 and 25 seconds in any case to afford the desired conversion while limiting the formation of cracked products to below 25% and preferably below about 20%.

It is pointed out in said copending application that it is essential that the processing conditions applied be chosen to insure that the wax feed is completely in the vapor phase. In perfecting the process it was found that if the wax was not completely vaporized in the reaction zone the process was inoperative.

The process of our copending application is operating when the wax is completely vaporized as specifically recommended and it is applicable for the isomerization of the wide range of waxes mentioned. It will be appreciated, however, that the process is most difficult to carry out when it is desired to isomerize residue waxes and other such waxes having molecular weights above about 500, since such waxes are next to impossible to vaporize without decomposition. Thus, for example, in the isomerization of bright stock wax a ratio of hydrogen to wax of over 300 was necessary to insure the absence of a liquid phase in the reaction zone. If complete vaporization was not maintained the small amount of liquid mist constituting the least volatile part of the wax collected on the catalyst. It soaked into the catalyst particles and was shortly converted into tarry deposits which blocked the catalyst surface. Also, attempts to effect the isomerization by passing the liquid wax through a bed of the catalyst failed to give any appreciable amount of isomerized product. This we now know was due to the fact that the short contact times found applicable in the vapor phase process were entirely too short.

It has now been found that the various paraffin waxes can in fact be effectively and advantageously isomerized in the liquid phase. It is found that in order to operate successfully in the presence of a liquid phase, it is essential that the wax be retained substantially completely in a liquid phase, i. e., the vaporization of the wax must be repressed by the application of lower temperatures and/or lesser amounts of hydrogen. When the wax is substantially completely in the liquid phase, the relatively large amount of liquid wax apparently exerts sufficient dissolving and washing action to prevent blocking of the catalyst surface with tars. Also, it is found that the isomerization takes place at a much slower rate in the liquid phase and that it is, therefore, necessary to employ much longer contact times. In other respects the process is similar to the vapor phase process.

Because of the large difference between the volume of a given amount of wax in the liquid phase and in the vapor phase and because of the lesser amounts of hydrogen required, a reaction vessel of given size is capable of even greater production capacity when operating according to the present invention with the wax largely in the liquid phase.

The liquid phase operation in the present invention is not markedly superior to the vapor phase operation of the described copending application for the conversion of the lower molecular weight waxes such as the hard paraffin wax obtained in the first dewaxing step in the dewaxing of petroleum lubricating oil, but it is vastly superior to the described vapor phase method for the treatment of the higher molecular weight waxes (e. g., having molecular weights above 500) and especially for the isomerization of residual waxes such as bright stock wax.

In the liquid phase isomerization process of the present invention any of the above mentioned waxes may be isomerized. The same above-mentioned catalyst is employed. As pointed out, the isomerization rate when operating in the liquid phase is considerably lower than when operating in the vapor phase; thus, contact times of upwards of five minutes are required. The contact time in minutes for continuous liquid phase operation is calculated by dividing the volume of the catalyst used by the volume of liquid wax passed in contact with the catalyst per minute. In vapor phase operation the contact time is calculated by dividing the volume of the catalyst used by the volume of the vapor mixture contacted with the catalyst used per minute. At these longer contact times there is a considerably greater opportunity for cracking reactions to take place. In view of this, and also to repress vaporization, it is desirable to retain the temperature somewhat lower than optimum for the vapor phase operation. The applicable temperature range is between about 300° C. and about 500° C. and the preferred temperatures are below about 490° C. The operation is preferably carried out under superatmospheric pressure, e. g., above 100 p. s. i. g.

In the liquid phase method of the present invention the presence of hydrogen in the reaction zone is essential but the presence of a large amount of hydrogen is neither essential nor desired Thus, mole ratios of hydrogen to wax between about 1 and 10 may be applied. Such low ratios can only be approached in the vapor phase process in the case of treating low molecular weight waxes that are easily vaporized.

In the liquid phase process the catalyst in the form of a powder may be slurried in the molten wax. The slurry may then be passed through a suitable reaction vessel while hydrogen is bubbled up through it. The catalyst may be retained in suspension either by mechanical agitation or by agitation caused by the introduction of the hydrogen. Alternatively, the catalyst may be in the form of a fixed bed of pieces and the molten wax may be gradually passed through the bed from the bottom to the top concurrently with recycled hydrogen. In this method the catalyst bed is flooded with liquid wax. A preferred method is to allow the molten wax to trickle down through a fixed bed of pieces of the catalyst while hydrogen is passed through the bed either concurrently or countercurrently.

When treating a paraffin wax under the conditions above described, the product consists of normally liquid oil, unconverted wax, partially converted wax, and a small amount of cracked products. The small amount of cracked material may be distilled from the oil and wax. Depending upon the starting material and the degree of conversion, the total or distilled (as above) product may vary in consistency from a slurry or mush to a grease-like or plastic material. In some cases the product may be used as is without any further processing. In other cases, particularly where a crude wax feed was used, it may be desirable to refine the product by extraction, clay treating, chemical treatment or the like.

While the product may find application without further refinement, it will generally be desirable to separate it into two or more fractions. Thus, by employing conventional dewaxing techniques, a very high quality lubricating oil fraction may be separated. The pour point of the oil will depend in part upon the dewaxing conditions used and in turn the yield will depend in part upon the pour point chosen. Excellent yields of very low pour point oil of adequate viscosity for commercial usage and having a high viscosity index have been obtained from the product of a single pass isomerization treatment. In view of its very low pour point and very high viscosity index, the oil is particularly suited for many special purposes such, for example, as refrigerator lubricating oil and low temperature hydraulic fluids.

The wax remaining after separating the oil consists of unconverted and partially converted wax and the mixture has a lower melting point and softer consistency than the starting material. It may be used as such or retreated to produce additional amounts of oil.

While the wax may be used as such or recycled, it may also be separated by known techniques into a fraction of partially converted wax and a fraction of unconverted wax. Either of these fractions may be recycled. Isoparaffin wax produced by the partial conversion of a wax consisting essentially of normal paraffins partakes somewhat of the characteristics of microcrystalline wax and may be used in place of microcrystalline wax. The isoparaffin wax differs from ordinary paraffin wax in having a much less brittle and more rubbery or plastic consistency. It resembles carnauba wax in its ability to absorb considerable quantities of oil without becoming sticky or tacky.

The amounts of the above products depend somewhat upon the character of the wax feed and largely upon the severity of the treating conditions (degree of conversion). When treating waxes under relatively mild conditions, only a small amount of oil is formed; when treating under more severe conditions the amount of oil is greatly increased, usually with more cracking.

The liquid phase method of operation is particularly advantageous for the isomerization of high molecular weight waxes that are difficult or impossible to vaporize. For example, the liquid phase method is particularly suited for the isomerization of so-called residue wax or bright stock wax. This wax yields novel and highly desirable lubricating oil; it is most difficult to treat in the vapor phase. Also when treating this high molecular weight material, a small to appreciable conversion to lower molecular weight products by hydrocracking is not detrimental as the products remain largely in the lubricating oil range; in fact, a highly desirable and novel light lubricating oil is produced.

The lubricating oils produced by the described process are novel oils having highly desirable properties. When starting with a paraffin wax obtained from a first dewaxing step and consisting almost completely of straight-chain paraffin hydrocarbons the lubricating oils produced consist largely of isoparaffin hydrocarbons. While these isoparaffins have a branched structure, they do not have the complicated structure obtained by the polymerization of olefins, e. g., isobutylene and, consequently, they are more thermally stable. While the lubricating oil consists largely of isoparaffins it will be noted that it contains appreciable amounts of aromatic constituents, this is especially the case when the oil is produced from residue waxes. The oil obtained by aluminum chloride isomerization is free of aromatic constituents and is, therefore, quite different. Also, the product differs from the lubricating oil produced by the isomerization of paraffin wax using aluminum chloride with decahydronaphthalene (or cyclohexane) as a cracking suppressor as described in the above-mentioned patent since the product of this patented process contains appreciable amounts of alkylation-condensation products of the decahydronaphthalene.

When starting with a residue wax such as bright stock wax the lubricating oils produced also differ from those produced by other methods; they consist predominantly of hydrocarbons having a cyclo-paraffin nucleus with attached long isoparaffin side chains. They also contain appreciable amounts of hydrocarbons having an aromatic nucleus. This latter type of hydrocarbon is not formed in the aluminum chloride process and if formed would be lost in the aluminum chloride catalyst phase.

*Example I.*—A hard, white, heavy distillate wax having the following properties was isomerized in the liquid phase:

Melting point _____ ca. 70° C.
Molecular weight _____ ca. 500.
n Paraffin _____ ca. 90%.

| Run No. | 1,904 | 2,038 | 2,039 |
|---|---|---|---|
| Temperature, °C | ca. 400 | 450 | 475 |
| Pressure, p. s. i. g | 500 | 500 | 500 |
| L. H. S. V | 2.5 | 5.1 | 5.2 |
| H₂/Feed, Mole Ratio | ca. 15 | ca. 15 | ca. 15 |
| H₂, Std. Ft.³/Bbl | ca. 3,200 | ca. 3,200 | ca. 3,200 |
| Products: | | | |
| Gas+Loss, percent weight | 4.0 | 5.0 | 7.1 |
| Below 300° C., percent weight | 4.3 | 10.8 | 23.1 |
| Above 300° C., percent weight | 91.8 | 84.2 | 69.9 |
| Analysis of 300° C.+: | | | |
| Aromatics, percent weight | 6.4 | 12.5 | 19.7 |
| Liquid Saturates, percent weight | 26.3 | 24.9 | 37.1 |
| Wax, percent weight | 59.0 | 46.8 | 13.0 |
| Aromatic Content of Oil above 300° C., percent weight | 19.5 | 33.4 | 34.8 |
| Properties of Light Oil (300–400° C.): | | | |
| Viscosity, 100° F., cs | | 4.61 | 4.05 |
| Viscosity, 210° F., cs | | 1.61 | 1.46 |
| Viscosity Index | | 112 | 106 |
| Pour Point, °F | | +40 | +15 |
| Properties of Heavy Lube Oil: | | | |
| Viscosity, 100° F., cs | ca. 19.8 | 24.20 | 21.33 |
| Viscosity, 210° F., cs | ca. 4.37 | 4.82 | 4.36 |
| Viscosity Index | ca. 138 | 136 | 131 |
| Pour Point, °F | ca. −21 | −35 | −35 |

*Example II.*—Bright stock wax is the very high molecular weight wax obtained from the residue remaining after distilling off the distillable lubricating oil fractions from a lubricating oil petroleum stock. The non-distillable oil (bright stock) in this residue is particularly desired for certain purposes and is in demand. A bright stock wax having the following inspection data was isomerized in the liquid phase.

Density, g./ml. at 20° C _____ 0.8899
Viscosity at 210° F. at A. S. T. M. D–445 _ 20.50
Molecular weight _____ ca. 717

The conditions and results are shown in the following table:

| | | | | |
|---|---|---|---|---|
| Temperature, °C. Max | 423 | 410 | 405 | 385 |
| Pressure, p. s. i. g | 504 | 504 | 502 | 500 |
| H₂/Feed Mole Ratio | 6.9 | 4.7 | 4.7 | 4.7 |
| Space Velocity (L. H. S. V.) | 1.6 | 2.3 | 2.3 | 2.3 |
| Light Lubricating Oil: | | | | |
| Percent By Weight of Charge | 20.7 | 11.5 | 8.7 | 3.0 |
| Viscosity, Centistokes at 100° F | 14 | 13 | .29 | .23 |
| Viscosity Index | 115 | 122 | 116 | 113 |
| Pour Point, °F | +20 | +20 | +25 | +20 |
| Heavy Lubricating Oil: | | | | |
| Percent By Weight of Charge | 20.3 | 20.6 | 20.6 | 21.3 |
| Viscosity, Centistokes at 100° F | 244 | 338 | 366 | 404 |
| Viscosity Index | 102 | 93 | 93 | 90 |
| Pour Point | +15 | +25 | +23 | +25 |

We claim as our invention:

1. A process for the production of a lubricating oil from paraffin wax which comprises contacting a molten normally solid paraffin wax in the liquid phase and with at least one mole of hydrogen per mole of wax with a supported platinum catalyst at a temperature between about 300° C. and about 500° C. and under a pressure between about 50 and 3000 p. s. i. g. for a contact time of at least 5 minutes but insufficient to produce more than 25% conversion to cracked products of lower molecular weight, cooling the product, separating and recycling the hydrogen-containing gas, distilling the product to remove a lubricating oil distillate, and subjecting the said distillate to a dewaxing treatment to separate unconverted wax from the liquid oil.

2. Process for the conversion of bright stock wax into bright stock which comprises melting bright stock wax and contacting the liquid wax in the presence of at least one mole of hydrogen per mole of wax with a supported platinum catalyst at a temperature between about 300° C. and about 500° C. and under a pressure between about 50 and 3000 p. s. i. g. for a contact time of at least 5 minutes but insufficient to produce more than 25% conversion to cracked products of lower molecular weight, cooling the product, separating and recycling the hydrogen-containing gas, distilling the product to remove distillable oil and dewaxing the residue to obtain bright stock.

3. The process according to claim 1 further characterized in that the molten wax is passed in the liquid phase through a bed of the catalyst under conditions of time and temperature such that not more than 25% of the wax is cracked to hydrocarbons lighter than lubricating oil.

4. A lubricating oil prepared by the process of claim 1.

GEORGE M. GOOD.
JOHN W. GIBSON.
BERNARD S. GREENSFELDER.

References Cited in the file of this patent
UNITED STATES PATENTS

| Number | Name | Date |
|---|---|---|
| 2,461,453 | Toettcher et al. | Feb. 8, 1949 |
| 2,475,358 | Moore | July 5, 1949 |
| 2,478,916 | Haensel | Aug. 16, 1949 |